United States Patent
Strubbe et al.

[11] Patent Number: 6,014,903
[45] Date of Patent: Jan. 18, 2000

[54] MASS FLOW MEASUREMENT IN FORAGE HARVESTERS

[75] Inventors: Gilbert J. I. Strubbe, Loppem; Bart M. A. Missotten, Leuven, both of Belgium

[73] Assignee: New Holland North America, Inc., New Holland, Pa.

[21] Appl. No.: 09/100,995

[22] Filed: Jun. 22, 1998

[51] Int. Cl.[7] ........................................ G01F 1/30
[52] U.S. Cl. ........................................ 73/861.73
[58] Field of Search ................ 73/861.73, 861.72, 73/861.71; 56/10.2 A, 10.2 B, 10.2 C, 10.2 R

[56] References Cited

U.S. PATENT DOCUMENTS

| | | | |
|---|---|---|---|
| 2,561,763 | 7/1951 | Waters et al. | 73/861.73 X |
| 4,441,101 | 4/1984 | Robar | 73/861.73 X |
| 4,538,471 | 9/1985 | Volk, Jr. et al. | 73/861.73 |
| 5,159,840 | 11/1992 | Leifeld | 73/861.73 |
| 5,282,389 | 2/1994 | Faivre et al. | 73/861.73 |
| 5,335,554 | 8/1994 | Kempf et al. | 73/861.73 |
| 5,343,761 | 9/1994 | Myers | 73/861.73 |
| 5,560,246 | 10/1996 | Bottinger et al. | 73/861.73 X |
| 5,561,250 | 10/1996 | Myers | 73/861.73 |
| 5,686,671 | 11/1997 | Nelson et al. | 73/861.73 |
| 5,698,794 | 12/1997 | Bussian | 73/861.73 |

FOREIGN PATENT DOCUMENTS

| | | |
|---|---|---|
| 0208025 | 1/1987 | European Pat. Off. . |
| 0501099 | 9/1992 | European Pat. Off. . |
| 0753720 | 1/1997 | European Pat. Off. . |
| 8911082 | 11/1989 | WIPO . |
| 9638713 | 12/1996 | WIPO . |

OTHER PUBLICATIONS

European Search Report.

*Primary Examiner*—Benjamin R. Fuller
*Assistant Examiner*—Jewel V. Thompson
*Attorney, Agent, or Firm*—Frank A. Seemar; Larry W. Miller; J. William Stader

[57] ABSTRACT

A forage harvester is equipped with a device for measuring the mass flow rate of the crop material processed by the machine. The device comprises a sensor member having a curved surface which is mounted for pivotment in an aperture in the spout of the harvester. The moment resulting from the mass flow is measured by a transducer. A resilient sealing is provided between the sensor member and the spout.

10 Claims, 3 Drawing Sheets

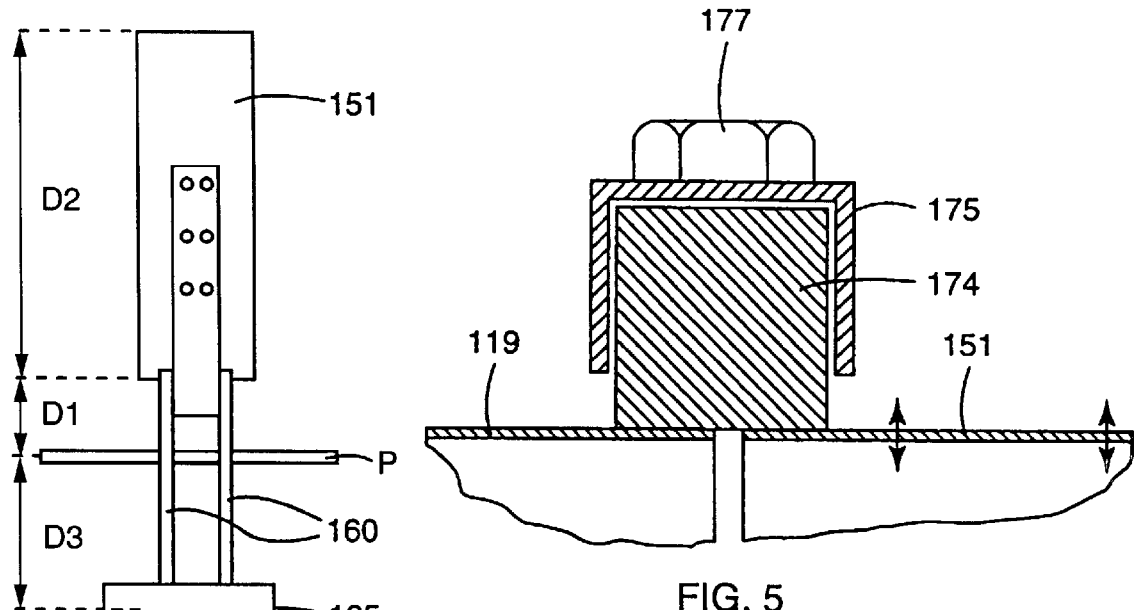
FIG. 3
FIG. 5
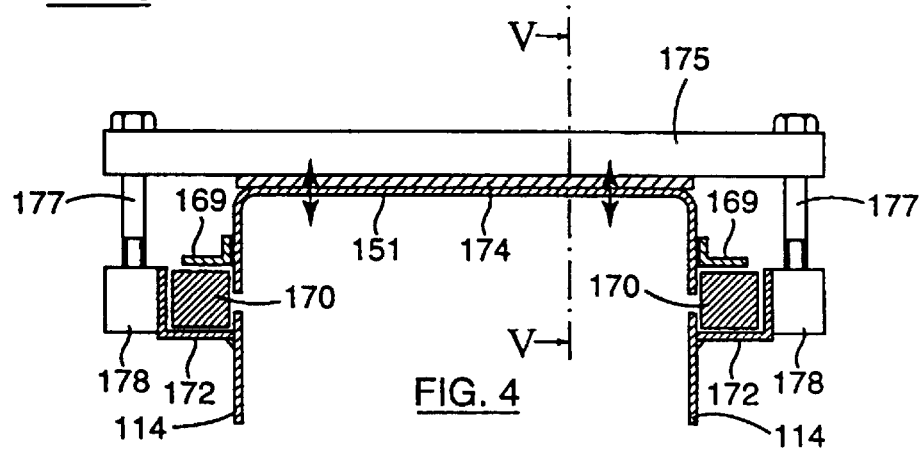
FIG. 4
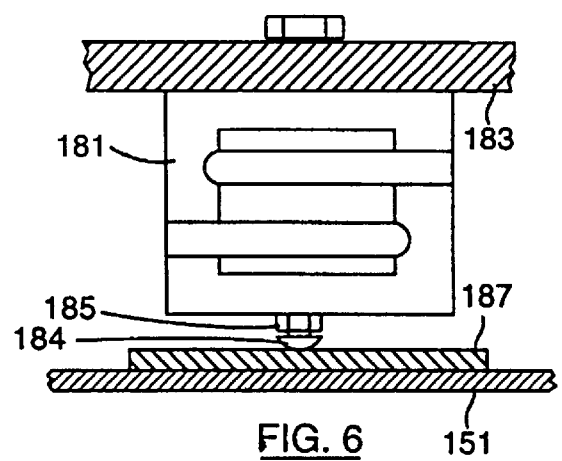
FIG. 6

MASS FLOW MEASUREMENT IN FORAGE HARVESTERS

FIELD OF INVENTION

This invention relates to a device for measuring the mass flow of bulk material, such as the flow of comminuted crop material in the spout of a forage harvester. More particularly it relates to apparatus comprising a sensor surface installed in a channel in which a streamline flow of the crop material is established.

BACKGROUND OF INVENTION

It is already known in the art to equip agricultural harvesters with apparatus for establishing the mass flow rate of crop material in order to gather data on the amount of harvested material over a time period and on the local yield rate in distinct areas of a field. Such apparatus has already been described with respect to combine harvesters in U.S. Pat. No. 5,343,761 and European Pat. No. EP-A-0 501 099. In U.S. Pat. No. 5,343,761 the mass flow rate is derived from the measurement of the forces resulting from the impact of grain kernels on a vertical plate which is installed in a clean grain elevator. The left and right edges of the impact plate are spaced from the elevator walls to prevent lodging of material other than grain between these edges and the walls. Consequently small particles may reach the area behind the impact plate and accumulate on the rear of the plate, thereby affecting the zero load of the apparatus and distorting the mass flow readings. Such apparatus requires cleaning at regular intervals.

The apparatus disclosed in European EP-A-0 501 099 uses variations in capacitance caused by a flow of grain to establish the momentary flow rate. This device comprises no movable sensor portions whereof the displacement under action of the mass flow is measured.

Another type of measuring device is shown in European Pat. No. EP-A-0 753 720. Herein the flow of crop material is guided along a curved surface which is mounted for pivotment about a transverse axis. A gap is provided between the curved surface and the housing of the grain elevator to enable free oscillation of the surface in its normal measurement range. The inlet section of the surface has to be dimensioned slightly larger than the dimension of the outlet of the grain elevator to preclude false readings, caused by impact on the edge, and loss of conveyed crop material. In the forage harvester illustrated in the same publication a sensor member for monitoring the mass flow rate has been installed in an aperture in the spout. The inlet portion of the sensor member is installed over the front edge of the aperture and its outlet portion extends over the rear edge of the same aperture in order to maintain all material within the spout. The gap between the body of the spout and the sensor member is a critical area for pollution by stray material, as a plugging thereof will result in false readings of the measuring apparatus.

SUMMARY OF THE INVENTION

Hence, it is an object of the present invention to provide a mass flow measuring apparatus which on the one hand provides reliable mass flow rate readings and on the other hand is not susceptible to disturbances caused by stray material hampering the displacement of movable parts of the apparatus.

According to the invention, an apparatus for measuring a mass flow rate of bulk material is provided, the apparatus comprising channel means, means for establishing a streamline flow of the bulk material along at least one guide surface of the channel means, a sensor surface installed in an aperture in the channel means, and at least one transducer for measuring a measurable quantity resulting from forces acting on the sensor surface, the forces comprising the force resulting from the flow of the processing crop material on the sensor surface. More particularly, it is contemplated that the sensor surface is installed in substantial alignment with the guide surface, and sealing means are provided between the outer rim of the sensor surface and the inner rim of the aperture in the channel means.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE DRAWINGS

FIG. 3 is a top plan view of the sensor assembly of FIG. 2.

FIG. 4 is a somewhat simplified cross section of the spout taken along line IV—IV in FIG. 1.

FIG. 5 is a somewhat simplified cross section of the spout taken along line V—V in FIG. 4.

FIG. 6 is view of the transducer taken in the direction of arrow VI in FIG. 2.

DESCRIPTION OF THE PREFERRED EMBODIMENT

Figure 1:
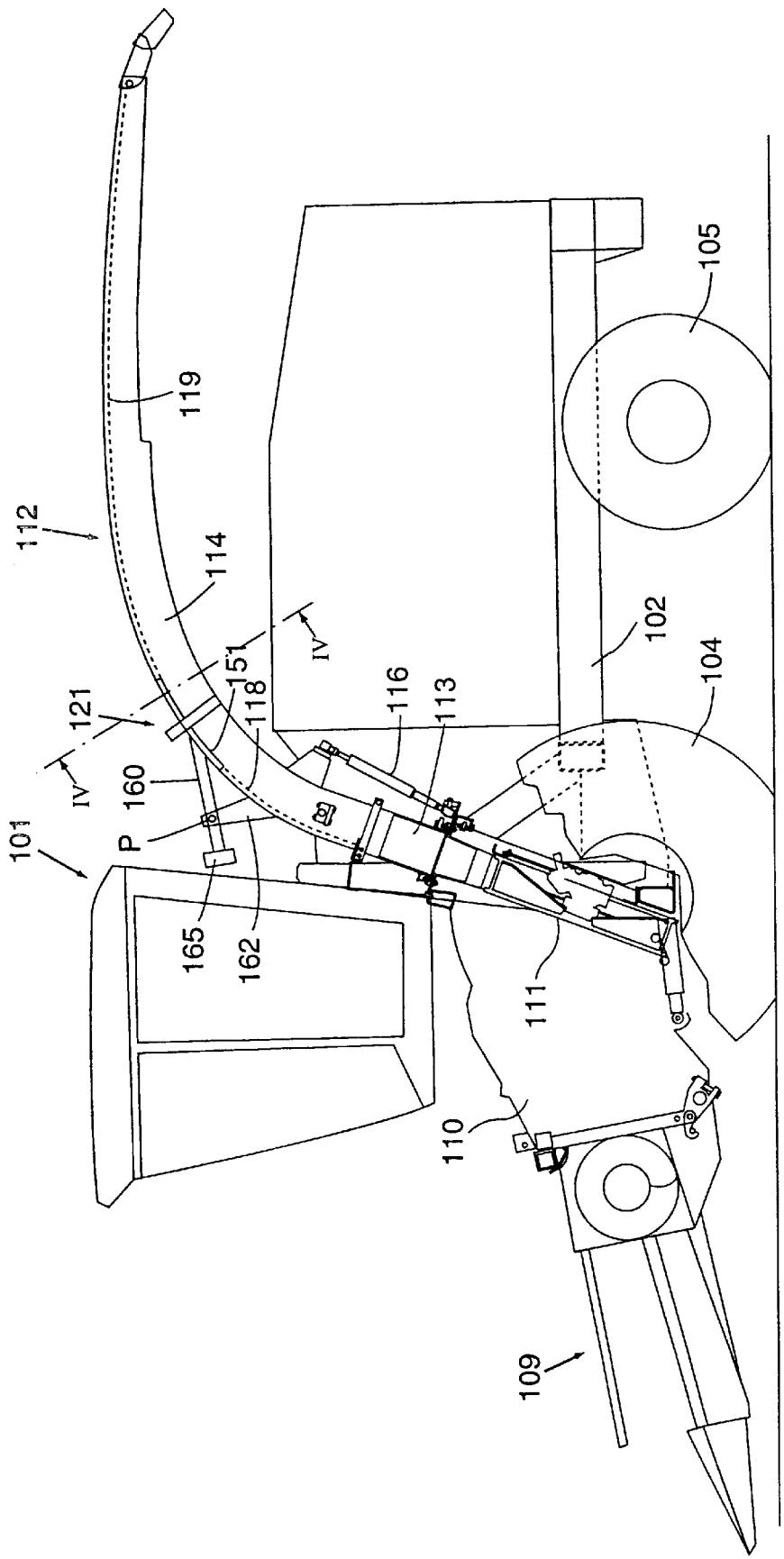
FIG. 1 is a side elevational view of a forage harvester comprising a spout and a mass flow rate measuring device according to the invention.

FIG. 1 shows a typical forage harvester 101 comprising a main frame 102 to which are mounted ground engaging traction wheels 104 and steering wheels 105. The forage harvester is shown equipped with a row crop attachment 109, suitable for the harvesting of corn, but which can be replaced with another type of attachment, depending on the type of crop to be harvested. The row crop attachment delivers the crop material to crop comminuting means installed in a front unit 110 of the forage harvester 101. The processed crop material is delivered to a blower rotor 111 which is installed within a blower housing, attached to the main frame 102. The blower rotor 111 throws said material upwardly into a discharge means 112, comprising a straight tube 113 and a curved discharge spout 114, which can be positioned by an operator to direct the cut crop material as required, normally into a wagon which is moving alongside or behind the forage harvester. The outlet direction of the spout is controlled by rotation of the tube 113 and extension or retraction of a hydraulic cylinder 116. Inside the spout 114 the crop is guided along channel means comprising a lower wear plate 118 and an upper wear plate 119. The wear plates 118, 119 are U-shaped in cross section and are mounted by bolts to the back of the spout 114 for easy replacement when they are worn out.

As indicated in European Pat. No. EP-A-0 753 720, the operator may want to assess the actual mass flow rate of the forage crop during normal harvesting operations. To this end a flow measurement device 121 is installed on the spout 114. A substantially rectangular aperture is provided in the curved top plate of the spout 114, between the wear plates 118, 119. This aperture is closed by a sensor assembly, comprising a curved sensor member 151 having a U-shaped cross section generally equal to the cross section of the wear plates 118, 119. The sensor member 151 is held in alignment with the channel means by a pair of support arms 160, attached via an extension 187 to the middle portion of the sensor member 151 and mounted for pivotment to a pair of upright brackets 162 extending from the lower half of the spout 114. The inlet portion of this sensor member 151 registers with the outlet portion of the lower wear plate 118 and the inlet portion of the upper wear plate 119 registers with the outlet portion of the sensor member 151. Preferably, the curvatures of both wear plates 118, 119 are equal in the areas adjacent the aperture and the curvature of the sensor member 151 is equal thereto. In this manner the flow of forage material in the spout 114 is not hampered by the transitions from the lower wear plate 118 to the sensor member 151 and from the sensor member 151 to the upper wear plate 119.

The sensor assembly further comprises a counterweight 165 provided at the front end of the support arms 160, for bringing the center of gravity of the sensor assembly to its pivot axis P. Because of this arrangement the zero load on the sensor member 151 will not be affected by changes in inclination of the spout 114.

As shown in FIG. 4, L-shaped profiles 169 are welded to both sides of the sensor member 151. These profiles are put to rest on a pair of longitudinal strips 170, which are held in reardwardly extending profiles 172 welded to the sides of the spout 114. The strips 170 are made of resilient, preferably impermeable material, such as rubber or closed-cell polyvinylchloride or polyurethane foam. The strips 170 seal the longitudinal gap between the sides of the sensor member 151 and the spout 114.

The transverse gaps between the rear and front edges of the sensor member 151 and the lower and upper wear plates 118, 119 are sealed by a pair of transverse strips 174, made out of the same material (FIG. 5). The strips 174 are held in place by inverted U-profiles 175 extending transversely over the transitions from the wear plates 118, 119 to the curved sensor member 151. A pair of bolts 177 extending through holes in the outer portions of the profiles 175 connect these profiles to mounting lugs 178 welded to the rear and front ends of the longitudinal profiles 169.

The resilient strips 170, 174 permit a small pivotal movement of the sensor member 151 about its pivot P, while sealing the gaps between the outer rim of the sensor member and the edges of the aperture in the spout 114.

Figure 2:
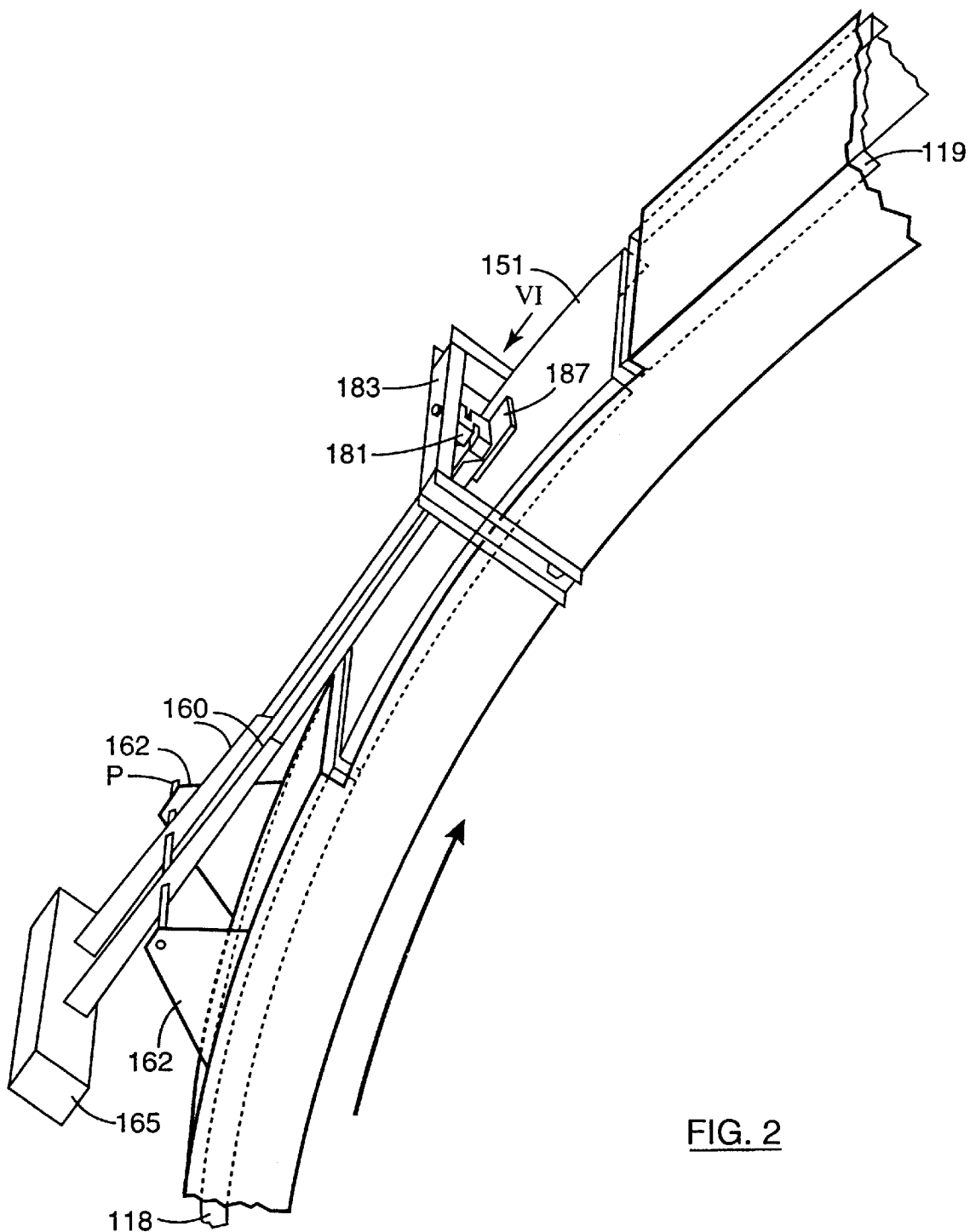
FIG. 2 is an enlarged, perspective view of the mounting of the sensor assembly on the spout of FIG. 1.

A flow of crop material along the curved sensor member 151 forces the same upwardly. This upward force is sensed by a transducer, which may be a load cell 181 as illustrated in FIGS. 2 and 6. The load cell is attached at its top to a bracket 183 which is mounted over the sensor member 151 and to the side walls of the spout 114. An adjustment screw 184 extends downwardly from the load cell 181 against the extension 187 of the support arms 160. The screw 184 is adjusted to provide a small pre-load on the load cell 181 and then is secured in place by a lock nut 185.

The total force acting on the sensor member 151 is the resultant of centrifugal, friction and gravity forces from the crop material as it flows along the curved surface of the sensor. By proper design of the sensor assembly as described in European Pat. No. EP-A-0 753 720, it is possible to balance the effects of friction on these forces, such that the resultant is substantially independent of changes in friction coefficient. This is particularly important in forage harvesters, which have to process a wide range of products, such as grass, alfalfa or corn, under a wide range of weather conditions. For instance, it is not uncommon to continue harvesting operations while it has started raining.

A satisfactory embodiment comprised a sensor member 151 having a curvature radius of 2550 mm and a length D2 of 490 mm (FIG. 3). The pivot P is located at a radius 2652 as seen from the center of curvature of the sensor member and at an angle $\alpha = -4.824°$ from its inlet edge. The distance D1 from this inlet edge to the pivot P is 240 mm. In the intermediate position of the spout 114, the inlet is at an angle of 51.50° to the horizontal. The force readings generated by this configuration are not dependent on the friction coefficient of the forage material on the wear plate 118 and the sensor member 151. The counterweight 165 is mounted at a distance D3 of 450 mm from the pivot P. The front edge of the sensor member 151 is at about 1 m from the inlet of the spout, such that the material flow has time to adapt to the form of the lower wear plate 118. No further guide plate is needed for conditioning the material flow into a streamline flow before the measurement can take place.

It may be assumed that the velocity of the forage material in the spout 114 does not vary much. However it may be advantageous to combine the reading of the transducer with the reading of a velocity sensor directed to the material flow adjacent or on the sensor member 151 in order to adjust the mass flow result for variations of the velocity. The velocity sensor may be directed to the lower side of the flow, but it has been found advantageous to direct it to the upper side of the flow, e.g. through an aperture in the spout 114 and a transparent section in the wear plate 118.

Although the present invention has been described with respect to a forage harvester, it will be understood that other embodiments can be thought of without departing however from the original idea of the invention. For example, a similar mounting and sealing may be used for measuring the mass flow rate in a combine harvester or other types of agricultural machinery. The load cell may also be replaced with another type of transducer, such as a proximity sensor or by a torque sensor on the pivot shaft of the sensor assembly.

While preferred structure in which the principles of the present invention are shown and described above, it is to be understood that the invention is not limited to such structure, but that, in fact, widely different means of varying scope and configuration may be employed in the practice of the invention.

Having thus described the invention, what is claimed is:

1. In apparatus for measuring a mass flow rate of bulk material in a forage harvester having a discharge spout, said apparatus comprising, channel means mounted in said discharge spout, means for establishing a streamline flow of said bulk material along at least one guide surface of said channel means, a generally rectangular sensor surface installed in a similarly generally rectangular aperture in said channel means, said generally rectangular sensor surface having a plurality of edges disposed adjacent a like plurality of edges of said similarly generally rectangular aperture, and at least one transducer for measuring a measurable quantity resulting from forces acting on said sensor surface, said forces comprising the force resulting from the flow of said bulk material on the sensor surface, the improvement comprising said sensor surface is installed in substantial alignment with said guide surface, and sealing means are provided between said edges of said sensor surface and said edges of said aperture in said channel means, said sealing means comprise strips of resilient material, permitting a small relative movement of said sensor surface to said channel means.

2. Apparatus according to claim 1 wherein said sealing means comprise sealing strips of closed cell foam material.

3. Apparatus according to claim 2 wherein said strips extend over a gap between said edges of said sensor surface and said edges of said aperture on the outside of said channel means.

4. Apparatus according to claim 3 wherein said sensor surface is generally channel shaped, and said strips are embedded in profiles attached to the outside of said sensor surface and channel means.

5. Apparatus according to claim 4 wherein said foam material is a polyurethane or polyvinylchloride foam.

6. Apparatus according to claim 2 wherein said transducer is a load cell.

7. Apparatus according to claim 6 wherein said sensor surface is firmly held between said sealing means and said load cell.

8. Apparatus according to claim 7 wherein said transducer measures a quantity indicative of the moment about a predetermined axis (P) of the forces acting on said sensor surface.

9. Apparatus according to claim 8 wherein said sensor surface is mounted for pivotment relative to said channel means about an axis (P) extending in a direction perpendicular to the direction of the flow on said sensor surface.

10. Apparatus according to claim 8 wherein the location of said axis (P) is such that said measurable quantity is substantially independent of the coefficient of friction between the bulk material and the surface.

\* \* \* \* \*